US010262059B2

(12) United States Patent
Liu et al.

(10) Patent No.: US 10,262,059 B2
(45) Date of Patent: Apr. 16, 2019

(54) METHOD, APPARATUS, AND STORAGE MEDIUM FOR TEXT INFORMATION PROCESSING

(71) Applicant: TENCENT TECHNOLOGY (SHENZHEN) COMPANY LIMITED, Shenzhen (CN)

(72) Inventors: Jie Liu, Shenzhen (CN); Yinghui Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 355 days.

(21) Appl. No.: 15/174,607

(22) Filed: Jun. 6, 2016

(65) Prior Publication Data
US 2016/0283583 A1 Sep. 29, 2016

Related U.S. Application Data

(63) Continuation of application No. PCT/CN2015/073864, filed on Mar. 9, 2015.

(30) Foreign Application Priority Data

Mar. 14, 2014 (CN) .......................... 2014 1 0097479

(51) Int. Cl.
*G06N 5/02* (2006.01)
*G06F 17/27* (2006.01)
(Continued)

(52) U.S. Cl.
CPC ...... *G06F 17/30684* (2013.01); *G06F 17/277* (2013.01); *G06F 17/28* (2013.01); *G06F 17/30705* (2013.01); *G06N 5/02* (2013.01)

(58) Field of Classification Search
CPC ............... G06F 19/00; G06F 17/30598; G06F 17/30864; G06F 17/30867; G06F 3/048;
(Continued)

(56) References Cited

U.S. PATENT DOCUMENTS

2003/0110147 A1 6/2003 Li et al.
2003/0176931 A1* 9/2003 Pednault ........... G06F 17/30539
700/31
(Continued)

FOREIGN PATENT DOCUMENTS

CN 101021838 A 8/2007
CN 101178714 A 5/2008
(Continued)

OTHER PUBLICATIONS

The State Intellectual Property Office of the People's Republic of China (SIPO) Office Action 1 for 201410097479.5 dated Mar. 19, 2018 7 Pages (including translation).
(Continued)

*Primary Examiner* — Angelica Ruiz
(74) *Attorney, Agent, or Firm* — Anova Law Group, PLLC

(57) ABSTRACT

Method, apparatus, and storage medium for text information processing are provided. The method includes: performing word segmentation on a target text according to a preset fixed word segmentation policy, and comparing a word segmentation result with a preset word segmentation list, to obtain a new word; adding the new word to the preset word segmentation list, to obtain a test word segmentation list; classifying a test text according to the preset word segmentation list, to obtain a first text, and classifying the test text according to the test word segmentation list, to obtain a second text; comparing classification accuracy of the first text with classification accuracy of the second text, and
(Continued)

determining a target new word from the new word according to a comparison result; and adding the target new word to the preset word segmentation list, and classifying the target text.

15 Claims, 6 Drawing Sheets

(51) Int. Cl.
  *G06F 17/28* (2006.01)
  *G06F 17/30* (2006.01)
(58) Field of Classification Search
  CPC ............. G06F 17/30528; G06F 17/274; G06F 17/277; G06F 17/2881
  USPC ........... 707/600–831, 899, 999.001–999.206
  See application file for complete search history.

(56) References Cited

U.S. PATENT DOCUMENTS

| | | | | |
|---|---|---|---|---|
| 2005/0144149 | A1* | 6/2005 | Li | G06K 9/00228 706/12 |
| 2008/0077570 | A1* | 3/2008 | Tang | G06F 17/30684 |
| 2008/0270384 | A1* | 10/2008 | Tak | G06F 17/30734 |
| 2012/0016660 | A1* | 1/2012 | Gillam | G06F 17/2715 704/8 |
| 2014/0079297 | A1* | 3/2014 | Tadayon | G06K 9/00 382/118 |
| 2014/0105497 | A1* | 4/2014 | Zadeh | G06K 9/344 382/177 |

FOREIGN PATENT DOCUMENTS

| | | |
|---|---|---|
| CN | 102023967 A | 4/2011 |
| CN | 102622373 A | 8/2012 |
| CN | 103106275 A | 5/2013 |
| CN | 103631938 A | 3/2014 |

OTHER PUBLICATIONS

Chunying Wu, "Web document representation method based on new-word discovery", Computer Applications. vol. 28 No. 3, Mar. 31, 2008, pp. 764-767.

Alaa Alahmadi et al., A New Text Representation Scheme Combining Bag-of-Words and Bag-of-concepts Approaches for Automatic Text Classification, 2013 IEEE GCC Conference and exhibition, Nov. 17, 2013, pp. 108-113.

The World Intellectual Property Organization (WIPO) International Search Report for PCT/CN2015/073864 dated May 4, 2015.

* cited by examiner

METHOD, APPARATUS, AND STORAGE MEDIUM FOR TEXT INFORMATION PROCESSING

CROSS-REFERENCE TO RELATED APPLICATION

This application is a continuation of PCT Application No. PCT/CN2015/073864, filed on Mar. 9, 2015, which claims priority to a Chinese patent application No. 201410097479.5, filed on Mar. 14, 2014, the content of all of which is incorporated herein by reference in their entirety.

FIELD OF THE TECHNOLOGY

The present disclosure generally relates to the computer field, and in particular, relates tip method, apparatus, and storage medium for text information processing.

BACKGROUND OF THE DISCLOSURE

In the prior art, text information such, as product evaluation information of a user, product suggestion data of a user, and data of retrieval performed on a network platform by a user may be classified; word segmentation may be performed on the text information to recognize, from the text information, an entry that is already included in the dictionary; and the text information is classified into preset categories according to a pre-designed algorithm. For example, information about comments of an application program by all users within one year may be obtained, and word segmentation may be performed on the obtained comment information, to be matched with entries included in an electronic dictionary database. If a word included in the electronic dictionary database is recognized, the comment information of the product may be classified into two categories, which are "positive comment" and "negative comment", by using a support vector machine classification algorithm. In the prior art, entries included in a dictionary are words in a fixed thesaurus. If a new word appears, and the new word cannot he found in the fixed thesaurus in dictionary, the new word cannot he recognized, thereby causing reduced precision in text information classification.

SUMMARY

Embodiments of the present invention provide a text information processing method and apparatus, which can solve a technical problem of low precision in classifying text information because a new word cannot be recognized in existing text information classification process.

An embodiment of the present invention provides as text information processing method applied to a terminal, the terminal including one or more processors, a memory, and program instructions stored in the memory, the program instructions being executed by the one or more processors, and the method including:

performing word segmentation on a target text according to a preset fixed word segmentation policy, to obtain a word segmentation result;

comparing the word segmentation result with a preset word segmentation list, to obtain a word segmentation result, which is not in the preset word segmentation list, as a new word;

adding the new word to the preset word segmentation list, to obtain a test word segmentation list;

classifying a test text according to the preset word segmentation list, to obtain a first text, and classifying the test text according to the test word segmentation list, to obtain a second text;

calculating classification accuracy Of the first text and classification accuracy of the second text;

comparing the classification accuracy of the first text with the classification accuracy of the second text, and determining a target new word from the new word according to a comparison result;

adding the target new word to the preset word segmentation list, to obtain a target preset word segmentation list; and classifying the target text according to the target preset word segmentation list.

An embodiment of the present invention provides a text information processing apparatus, including:
one or more processors;
a memory; and
one or more program modules, stored in the memory, executed by the one or more processors, and the one or more program modules including:

a new-word processing module, configured to perform ward segmentation on a target text according to a preset fixed word segmentation policy, to obtain a word segmentation result; and compare the word segmentation result with a preset word segmentation list, to obtain a word segmentation result, which is not in the preset word segmentation list, as a new word;

an adding module, configured to add the new word to the preset word segmentation list, to obtain a test word segmentation list;

a test-text classification module, configured to classify a test text according to the preset word segmentation list, to obtain a first text, and classify the test text according to the test word segmentation list, to obtain a second text;

a target-new-word determining module, configured to calculate classification accuracy of the first text and classification accuracy of the second text, compare the classification accuracy of the first text with the classification accuracy of the second text, and determine a target new word from the new word according to a comparison result; and a target-text classification module, configured to add the target new word to the preset word segmentation list, to obtain a target preset word segmentation list; and classify the target text according to the target preset word segmentation list.

An embodiment of the present invention provides a non-transitory computer readable storage medium, having computer executable instructions stored therein, and when these executable instructions run in a terminal, the terminal executing a text information processing method, including:

performing word segmentation on a target text according to a preset fixed word segmentation policy, to obtain a word segmentation result;

comparing the word segmentation result with a preset word segmentation list, to obtain a word segmentation result, which is not in the preset word segmentation list, as a new word;

adding the new word to the preset word segmentation list, to obtain a test word segmentation list;

classifying a test text according to the preset word segmentation list, to obtain a first text, and classifying the test text according to the test word segmentation list, to obtain a second text;

calculating classification accuracy of the first text and classification accuracy of the second text;

comparing the classification accuracy of the first text with the classification accuracy of the second text, and determining a target new word from the new word according to a comparison result;

adding the target new word to the preset word segmentation list, to obtain a target preset word segmentation list; and classifying the target text according to the target preset word segmentation list.

By using the foregoing method, apparatus, and storage medium, a new word can be recognized in classifying text information, and a target new word can be added to as word segmentation list, to further classify a target text, thereby improving precision in classifying the text information.

BRIEF DESCRIPTION OF THE DRAWINGS

To describe the technical solutions of the embodiments of the present invention or the prior art more clearly, the following briefly introduces the accompanying drawings required for describing the embodiments or the prior art. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Figure 1:
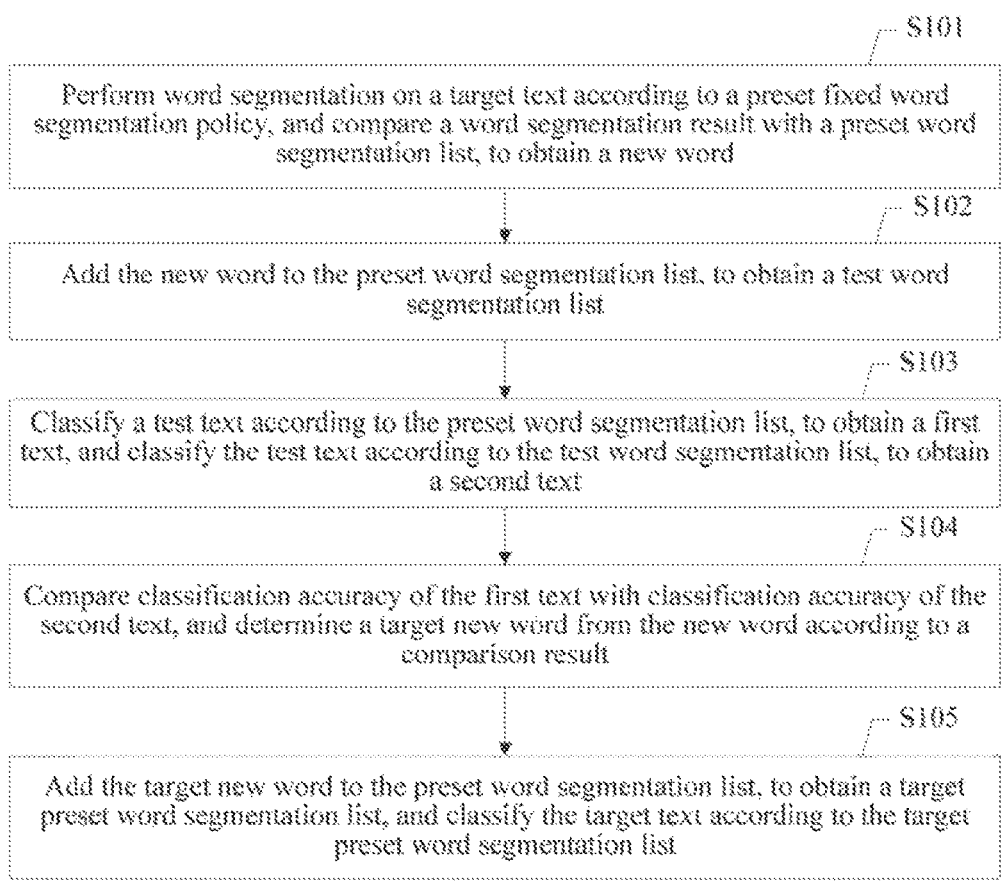
FIG. 1 is a schematic flowchart of a text information processing method according to an embodiment of the present invention.

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

In embodiments of the present invention, a text information processing apparatus may be a terminal such as a personal computer, a tablet computer, or an intelligent mobile phone, or may also be implemented by using a client module in the terminal. The client module may include, for example: a mail classification client and a comment classification client. The text information processing apparatus or a terminal in which the text information processing apparatus runs may include one or more processors and a memory storing computer program instructions, where the computer program instructions are executed by the one or more processors, to implement a text information processing method.

Text information in the embodiments of the present invention specifically may include text information such as product evaluation information of a user, product suggestion data of a user, and data of retrieval performed on a network platform by a user, and specifically is not limited by the embodiments of the present invention. In the embodiments of the present invention, the text information includes a target text, a test text, a training text, or the like. The target text is text information that needs to be classified, the test text is text information that is used in a classification model to test classification accuracy, and the training text is text information that is used to perform classification training when a classification model is constructed.

Specifically, classification of the text information may be implemented by using a preset classification algorithm. Optionally, the preset classification algorithm may include, a statistical method, as machine learning method, a decision tree, or the like. An objective of the classification is to construct a classification function or a classification model (which is also referred to as a classifier) according to a characteristic of a data set, where the classifier needs to be obtained through training by using a manually annotated classification training corpus. A process of constructing the model may include two phases, including a training phase and a testing phase. Before the model is constructed, a data set may be randomly divided into a training data set and a testing data set. In the training phase, the training data set is used to construct the model by analyzing a database tuple that is described by using attributes. It is assumed that, each tuple belongs to one predefined category, and is determined by using an attribute that is referred to as a mark number attribute. A single tuple in the training data set is also referred to as a training text, and a form of a specific training text may be: $(u_1, u_2, \ldots u_i; c)$, where ui indicates an attribute value, and c indicates a category. In the testing phase, classification accuracy of the model is evaluated by using the testing data set, where a single tuple in the testing data set is also referred to as to test text If the accuracy of the model meets a preset condition, the model may be used to classify another data tuple.

However, in the prior art, entries included in a dictionary are words in a fixed thesaurus. If a new word appears, and the new word cannot be found in the fixed thesaurus in the dictionary, the new word cannot be recognized, thereby causing reduced precision in classifying text information. In the embodiments of the present invention, a new word may be recognized, a target new word may be added to a preset word segmentation list, to obtain a target preset word segmentation list, and a target text may be classified according to the target preset word segmentation list, thereby improving precision in classifying text information.

The following describes, in details with reference to FIG. 1, a text information processing method provided in the embodiments of the present invention.

Referring to FIG. 1, FIG. 1 is a schematic flowchart of a text information processing method according to an embodiment of the present invention. The method may include the following steps: S101 to S105.

S101: Perform word segmentation on a target text according to a preset fixed word segmentation policy, and compare a word segmentation result with a preset word segmentation list, to obtain a new word.

As an optional implementation manner, the performing word segmentation on a target text according to a preset fixed word segmentation policy specifically may include:

intercepting the target text every N Characters from the first character, to obtain multiple word strings, where a character quantity of each word string is N, and N is a positive integer greater than 1.

Specifically, for example, for a target text 1 in Chinese: "抓狂, 盗号的太垃圾了, 由把我的号码盗走了, 请允悲, 还好有密保手机, 帮我找回来了, 感谢", (which means "crazy, the hacker is too disgrace, stole my number again, please allow my sadness, fortunately encrypted mobile phone helped me find it, thanks"), N may set to be 3, and then the target text 1 is intercepted every N characters from the first character in the above Chinese characters in the target text 1. In a specific implementation, it may be that, each sentence is intercepted every N characters, and for a sentence with fewer than 3 characters, the sentence is directly intercepted as one word. Therefore, a word segmentation result of the target text 1 in Chinese may be: "抓狂, 盗号的, 号, 的太, 的太垃, 太垃圾, 垃圾了, 由把我, 把我的, 我的号, 的号码, 号码盗, 码盗走, 盗, 走了, 请允悲, 还好有, 好有密, 有密保, 密保手, 保手机, 帮我找, 我找回, 找回来, 回来了, 感谢" (based on the above Chinese character "抓狂, 盗号的太垃圾了, 由把我的号码盗, 走了, 请允悲, 还好有密保手机, 帮我找回来了, 感谢"). Further, N may also be set to be 2, 4, or the like, and corresponding to different values of N, word segmentation may be performed on a same target text such as target text 1.

In a specific implementation, whether a word in the word segmentation result matches a word in the preset word segmentation list may be determined, and if not, statistics is collected on an eigenvalue of a mismatched word, where the eigenvalue includes a frequency at which the mismatched word appears in the target text; and the mismatched word is determined as the new word if the eigenvalue of the mismatched word meets a preset eigenvalue.

The preset word segmentation list is associated with the preset classification algorithm, and in the preset classification algorithm, word segmentation may be performed on text information according to the preset word segmentation list and the text information may be classified. In this embodiment of the present invention, a word in the word segmentation result may be matched with a word in the preset word segmentation list. If a word that matches as word in the word segmentation result does not exist in the preset word segmentation list, an eigenvalue of the word is calculated. Specifically, an eigenvalue of the word in a single target text may be calculated, or eigenvalues of the word in all target texts may also be calculated in a case when multiple target texts are included. Further, the eigenvalue includes a frequency at which the mismatched word appears in the target text. The mismatched word is determined as the new word if the eigenvalue of the mismatched word meets a preset eigenvalue.

Additionally and optionally, the eigenvalue may also include to probability that the mismatched word appears in the target text, which specifically is not limited by this embodiment of the present invention.

S102: Add the new word to the preset word segmentation list, to obtain a test word segmentation list.

As an optional implementation manner, the new word obtained in step S101 is added to the preset word segmentation list, to obtain the test word segmentation list, where the test word segmentation list is used to classify the test text.

S103: Classify a test text according to the preset word segmentation list, to obtain a first test, and classify the test text according to the test word segmentation list, to obtain a second text.

As an optional implementation manner, the test text is classified according to a preset classification algorithm, to obtain the first text, where the preset classification algorithm is associated with the preset word segmentation list; and the test text is classified according to the preset classification algorithm, to obtain the second text, where the preset classification algorithm is associated with the test word segmentation list. In a classification process, the test text remains unchanged, and corresponding to different word segmentation lists, the test text is classified by using the preset classification algorithm, where the preset word segmentation list corresponds to the first text, the test word segmentation list corresponds to the second text, and the first text and the second text are text information obtained after the test text is classified by using a preset classification method.

S104: Compare classification accuracy of the first text with classification accuracy of the second text, and determine a target new word from the new word according to a comparison result.

As an optional implementation manner, the classification accuracy of the first text and the classification accuracy of the second text may be separately calculated. Specifically, if there are multiple new words, for each new word, classification accuracy of a first text corresponding to the each new word and classification accuracy of a second text corresponding to the each new word are separately calculated; and whether a difference between the classification accuracy of the first text corresponding to the each new word and the classification accuracy of the second text corresponding to the each new word meets a preset difference is determined, and if yes, the new word is determined as the target new word. If there are multiple new words, the new words may be added to the preset word segmentation list one by one. Each new word corresponds to one test word segmentation list, and therefore, a second text obtained corresponding to each new word is different, and accuracy of the second text corresponding to each new word is different, while the classification accuracy of the first text is the same. The preset difference is a preset editable accuracy difference, and is a positive number, that is, the classification accuracy of the second text is greater than the classification accuracy of the first text, for example, the preset difference is 0.1% to 5%. Further, the classification accuracy may be calculated by using a test model in the preset classification algorithm.

S105: Add the target new word to the preset word segmentation list, to obtain a target preset word segmentation list, and classify the target text according to the target preset word segmentation list.

As an optional implementation manner, the determined target new word may be added to the preset word segmentation list, to obtain the target preset word segmentation list; and the preset classification algorithm is calibrated according to the target preset word segmentation list, and the target text is classified according to the calibrated preset classification algorithm.

In the text information processing method provided in this embodiment of the present invention, word segmentation may be performed on a target text according to a preset fixed word segmentation policy; a new word may be obtained by comparing a word segmentation result with a preset word segmentation list; classification accuracy of a first text before the new word is added may be compared with classification accuracy of a second text after the new word is added, so as to determine a target new word from the new word according to a comparison result; furthermore, the target new word is added to the preset word segmentation list, to obtain a target preset word segmentation list; and the target text may be classified according to the target preset word segmentation list, so that the new word is recognized, and the target new word is added to a word segmentation list, to classify the target text, thereby improving precision/accuracy in classifying text information.

The following describes, in details with reference to FIG. 2 to FIG. 5, a text information processing apparatus provided in embodiments of the present invention. It should be noted that, the apparatus shown in any one of FIG. 2 to FIG. 5 is configured to execute the method in the embodiment shown in FIG. 1 of the present disclosure. For the convenience of description, only a part relevant to the embodiments of the present invention is shown. For specific technical details that are not disclosed, refer to the embodiment shown in FIG. 1 of the present disclosure.

Figure 2:
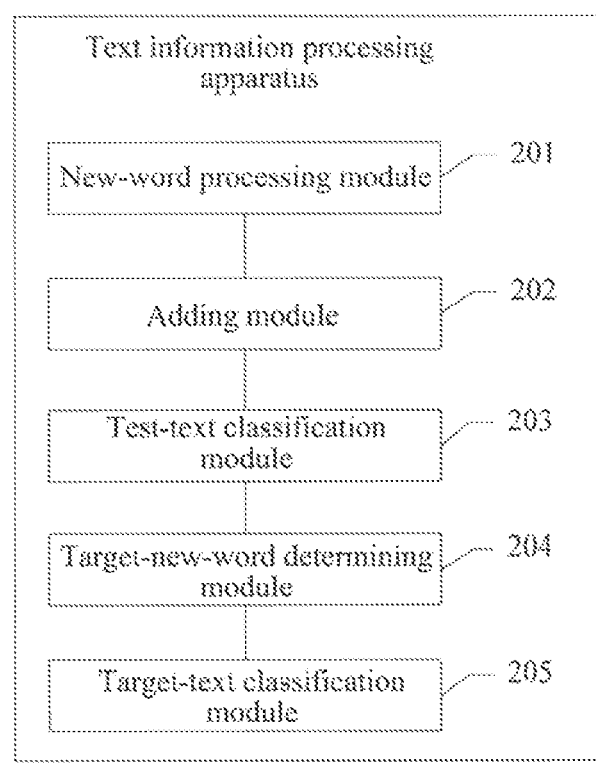
FIG. 2 is a schematic structural diagram of a text information processing apparatus according to an embodiment of the present invention.

Referring to FIG. 2, FIG. 2 is a schematic structural diagram of a text information processing apparatus according to an embodiment of the present invention. As shown in FIG. 2, the text information processing apparatus in this embodiment of the present invention may include: a new-word processing module 201, an adding module 202, a test-text classification module 203, a target-new-word determining module 204, and a target-text classification module 205.

The new-word processing module 201 is configured to perform word segmentation on a target text according to a preset fixed word segmentation policy, and compare a word segmentation result with a preset word segmentation list, to obtain a new word.

As an optional implementation manner, that the new-word processing module 201 performs word segmentation on a target text according to a preset fixed word segmentation policy specifically may include:

intercepting the target text every N characters from the first character, to obtain multiple word strings, where a character quantity of each word string is N, and N is a positive integer greater than 1.

Specifically, for example, for a target text 1 in Chinese: "抓狂, 盗号的太垃圾了, 由把我的号码盗走了, 请允悲, 还好有密保手机, 帮我找回来了, 感谢", (which means "crazy, the hacker is too disgrace, stole my number again, please allow my sadness, fortunately encrypted mobile phone helped me find it, thanks"). N may set to be 3, and then the target text 1 is intercepted every N characters from the first character in the above Chinese characters in the target text 1. In a specific implementation, it may be that each sentence is intercepted every N characters, and for a sentence with fewer than 3 characters, the sentence is directly intercepted as one word. Therefore, a word segmentation result of the target text 1 in Chinese may be: "抓狂, 盗号的, 号, 的太, 的太垃圾, 太垃圾, 垃圾了, 由把我, 把我的, 我的号, 的号码, 号码盗, 码盗走, 盗, 走了, 请允悲, 还好有, 好有密, 有密保, 密保手, 保手机, 帮我找, 我找回, 找回来, 回 来了, 感谢" (based on the above Chinese character "抓狂, 盗号的太垃圾了, 由把我的号码盗, 走了, 请允悲, 还好有密保手机, 帮我找回来了, 感谢"). Further, N may also be set to be 2, 4, or the like, and corresponding to different values of N, word segmentation may be perforated on a same target text such as target text 1.

Figure 3:
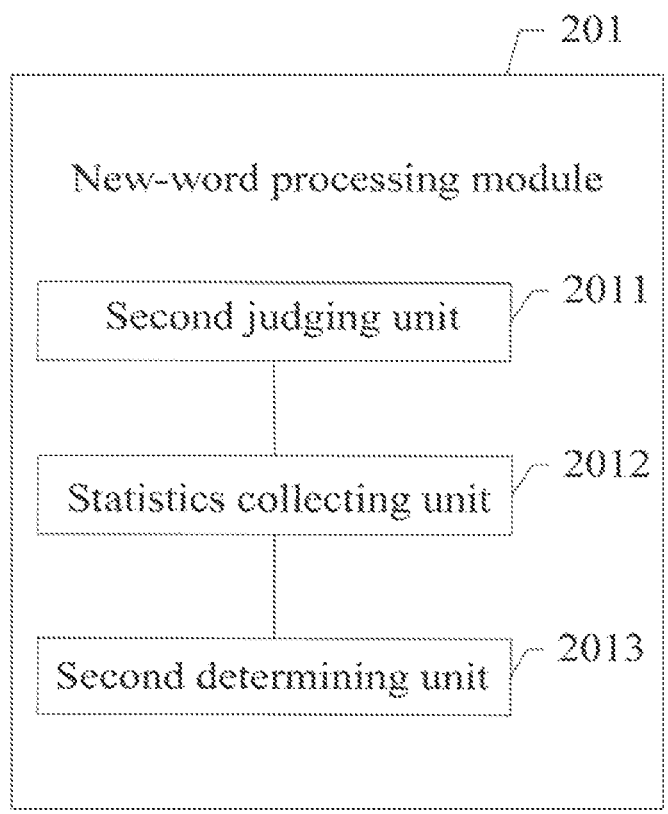
FIG. 3 is a schematic structural diagram of a new-word processing module according to an embodiment of the present invention.

As an optional implementation manner, as shown in FIG. 3, FIG. 3 is a schematic structural diagram of a new-word processing module according to this embodiment of the present invention. As shown in the figure, the new-word processing module 201 may include a second judging unit 2011, a statistics collecting unit 2012, and a second determining unit 2011 where:

the second judging unit 2011 is con figured to determine whether a word in the word segmentation result matches a word In the preset word segmentation list;

the statistics collecting unit 2012 is configured to collect statistics on an eigenvalue of a mismatched word when a determining result of the second judging unit is no, where the eigenvalue includes a frequency at which the mismatched word appears in the target text; and the second determining unit 2013 is configured to determine the mismatched word as the new word if the eigenvalue of the mismatched word meets a preset eigenvalue.

The preset word segmentation list is associated with a preset classification algorithm, and in the preset classification algorithm, word segmentation may be performed on text information according to the preset word segmentation list and the text information may be classified. In this embodiment of the present invention, a word in the word segmentation result may be matched with a word in the preset word segmentation list. If a word that matches a word in the word segmentation result does not exist in the preset word segmentation list, an eigenvalue of the word is calculated. Specifically, an eigenvalue of the word in a single target text may be calculated, or eigenvalues of the word in all target texts may also be calculated in a case when multiple target texts are included. Further, the eigenvalue includes a frequency at which the mismatched word appears in the target text. The mismatched word is determined as the new word if the eigenvalue of the mismatched word meets a preset eigenvalue.

Additionally and optionally, the eigenvalue may also include a probability that the mismatched word appears in the target text, which specifically is not limited by this embodiment of the present invention.

The adding module 202 is configured to add the new word to the preset word segmentation list, to obtain a test word segmentation list.

As an optional implementation manner, the adding module 202 adds, to the preset word segmentation list, the new word obtained by the new-word processing module 201, to obtain the test word segmentation list, where the test word segmentation list is used to classify a test text.

The test-text classification module 203 is configured to classify a test text according to the preset word segmentation list, to obtain a first text, and classify the test text according to the test word segmentation list, to obtain a second text.

Figure 4:
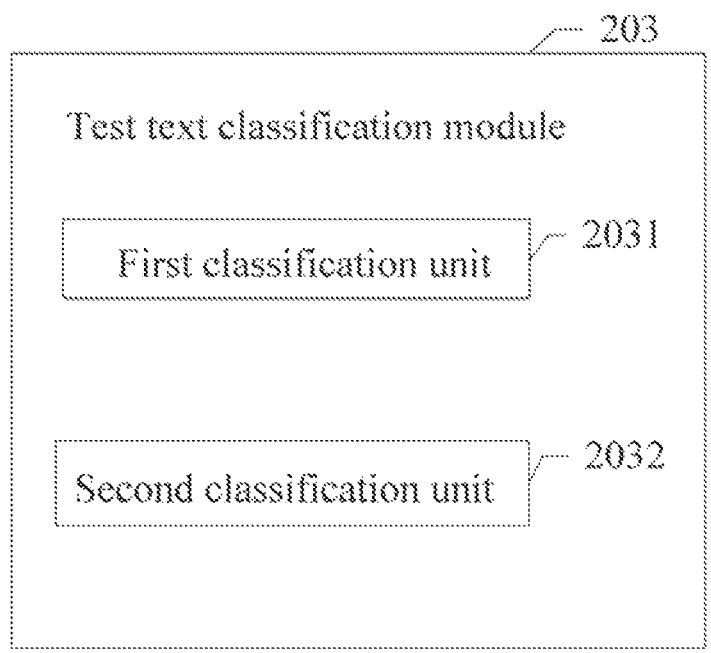
FIG. 4 is a schematic structural diagram of a test-text classification module according to an embodiment of the present invention.

As an optional implementation manner, as shown in FIG. 4, FIG. 4 is a schematic structural diagram of a test-text classification module according to this embodiment of the present invention. As shown in the figure, the test-text classification module 203 may include: a first classification unit 2031 and a second classification unit 2032, where the first classification unit 2031 is configured to classify the test text according to a preset classification algorithm, to obtain the first text, where the preset classification algorithm is associated with the preset word segmentation list; and the second classification unit 2032 is configured to classify the test text according to the preset classification algorithm, to obtain the second text, where the preset classification algorithm is associated with the test word segmentation list.

Specifically, in a classification process, the test text remains unchanged, and corresponding to different word segmentation lists, the test text is classified by using the preset classification algorithm, where the preset word segmentation list corresponds to the first text, the the test word segmentation list corresponds to the second text, and the first text and the second text are text information obtained after the test text is classified by using a preset classification method.

The target-new-word determining module 204 is configured to compare classification accuracy of the first text and classification accuracy of the second text, and determine a target new word from the now word according to a comparison result.

Figure 5:
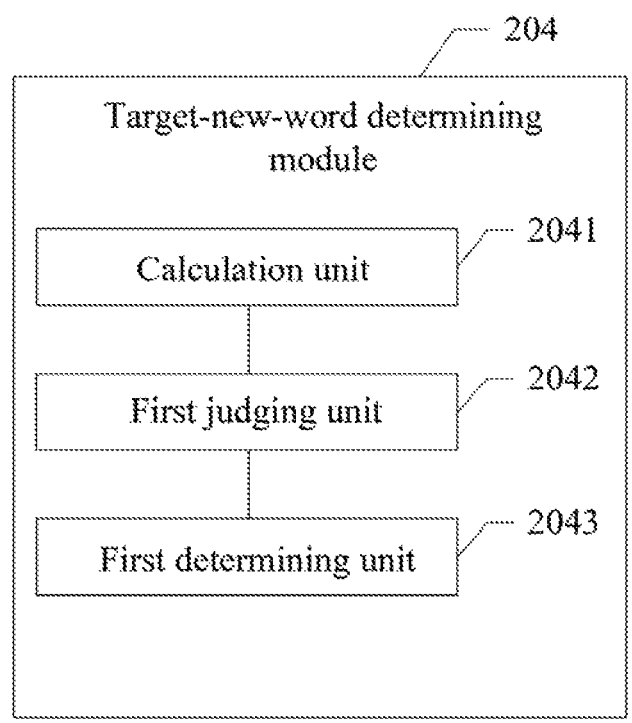
FIG. 5 is a schematic structural diagram of a target-new-word determining module according to an embodiment of the present invention.

As an optional implementation manner, the classification accuracy of the first text and the classification accuracy of the second text may be separately calculated. Specifically if there are multiple new words, as shown in FIG. 5, which is a schematic structural diagram of a target-new-word determining module according to this embodiment of the present invention, the target-new-word determining module 204 may include; a calculation unit 2041, a first judging unit 2042, and a first determining unit 2043, where:

the calculation unit 2041 is configured to separately calculate, for each new word, classification accuracy of a first text corresponding to the each new word and classification accuracy of a second text corresponding to the each new word;

the first judging unit 2042 is configured to determine whether a difference between the classification accuracy of the first text corresponding to the each new word and the classification accuracy of the second text corresponding to the each new word meets a preset difference; and the first determining unit 2043 is configured to determine the new word as the target new word when a determining result of the first judging unit is yes.

Specifically, if there are multiple new words, the new words may be added to the preset word segmentation list one by one. Each new word corresponds to one test word segmentation list, and therefore, a second text obtained corresponding to each new word is different, and accuracy of the second text corresponding to each new word is different, while the classification accuracy of the first text is the same. The preset difference is as preset editable accuracy difference, and is a positive number, that is, the classification accuracy of the second text is greater than the classification accuracy of the first text, for example, the preset difference is 0.1% to 5%. Further, the classification accuracy may be calculated by using a test model in the preset classification algorithm.

The target-text classification module 205 is configured to add the target new word to the preset word segmentation list, to obtain a target preset word segmentation list, and classify the target text according to the target preset word segmentation list.

As an optional implementation manner, the determined target new word may be added to the preset word segmentation list, to obtain the target preset word segmentation list; and the preset classification algorithm is calibrated according to the target preset word segmentation list, and the target text is classified according to the calibrated preset classification algorithm.

Figure 6:
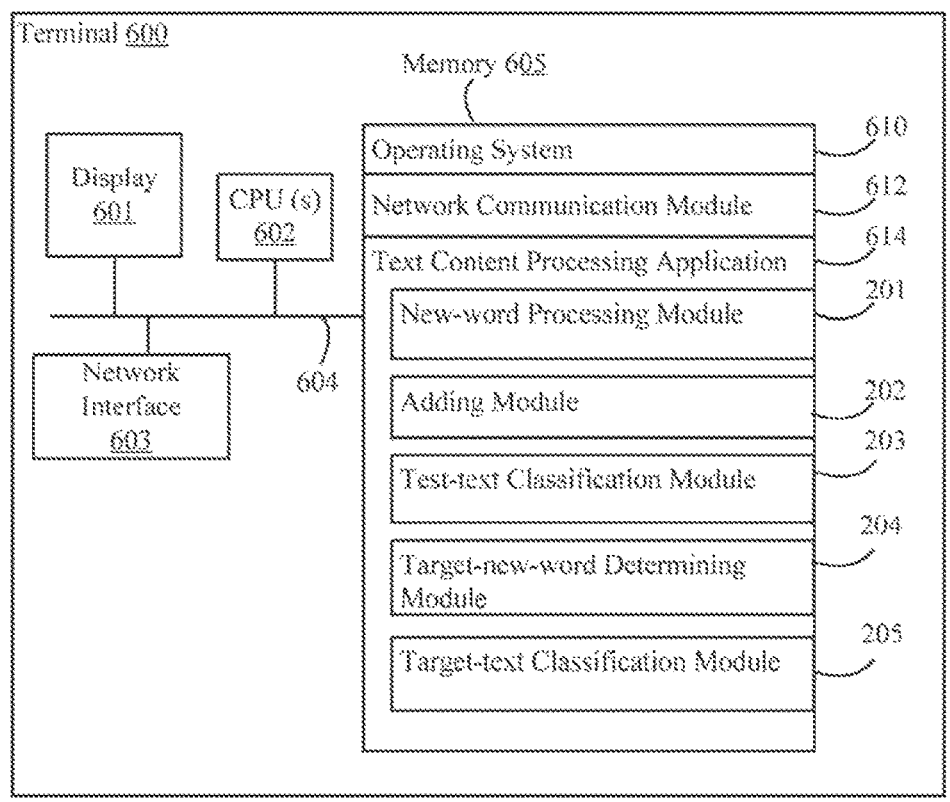
FIG. 6 is a schematic structural diagram of a terminal according to an embodiment of the present invention.

FIG. 6 is a schematic structural diagram of a terminal according to an embodiment of the present invention. This embodiment uses an example that a text information processing apparatus runs in the terminal 600 as an application program.

The terminal 600, typically, includes a display 601, one or more processing units (CPUs) 602, one or more network interfaces 603, a memory 605, and one or more communication buses 604 for interconnecting these components (sometimes called as a chipset).

The memory 605 includes a high-speed random access memory, such as a DRAM, a SRAM, and a DDR RAM, or another random access solid state storage device; and, optionally, includes a non-volatile memory, such as one or more magnetic disk storage devices, one or more optical disk storage devices, one or more flash memory devices, or one or more other non-volatile solid state storage devices. The memory 605, optionally, includes one or more storage devices remotely located from one or more processing units 602. The memory 605, or alternatively a non-volatile memory within the memory 605, includes a non-transitory computer readable storage medium. In some implementations, the memory 605, or the non-transitory computer readable storage medium of the memory 605, stores data structures, or a subset or superset thereof:

an operating system 610, including procedures for handling various basic system services and for performing hardware dependent tasks; and a network communication module 612, configured to connect the terminal 600 to other computing devices (for example, a server system and a machine server) connected to one or more networks via one or more network interfaces 603 (wired or wireless); and a text content processing application 614 includes one or more program modules, which are executed by the one or more processing units 602 to perform the text content processing method described in FIG. 1.

In the embodiment, the program modules are described above in FIG. 2.

A person of ordinary skill in the art may understand that all or some of the processes of the method embodiments may be implemented by a computer program instructing relevant hardware. The program may be stored in a computer readable storage medium. When the program runs, the processes of the method embodiments are performed. The storage medium may be a magnetic disk, an optical disc, as read-only memory (ROM), or a random access memory (RAM).

Disclosed above are only preferred embodiments of the present invention, and certainly cannot be used to limit a scope of the present disclosure. Therefore, equivalent changes made according to claims of the present disclosure still fall within a scope covered by the present disclosure.

What is claimed is:

1. A text information processing method, applied to a terminal, the terminal comprising one or more processors, a memory, and program instructions stored in the memory, the program instructions being executed by the one or more processors, and the method comprising:
    performing word segmentation on a target text according to a preset fixed word segmentation policy, to obtain a word segmentation result;
    comparing the word segmentation result with a preset word segmentation list, and obtaining a word, which is not in the preset word segmentation list, as a new word;
    adding the new word to the preset word segmentation list, to obtain a test word segmentation list;
    classifying a test text according to the preset word segmentation list, to obtain a first text, and classifying the test text according to the test word segmentation list, to obtain a second text;
    calculating classification accuracy of the first text and classification accuracy of the second text;
    comparing the classification accuracy of the first text with the classification accuracy of the second text, and determining a target new word from the new word according to a comparison result;
adding the target new word to the preset word segmentation list, to obtain a target preset word segmentation list; and
classifying the target text according to the target preset word segmentation list,
wherein the classifying a test text according to the preset word segmentation list, to obtain a first text, and classifying the test text according to the test word segmentation list, to obtain a second text comprises:
classifying the test text according to a preset classification algorithm, to obtain the first text, wherein the preset classification algorithm is associated with the preset word segmentation list; and
classifying the test text according to the preset classification algorithm, to obtain the second text, wherein the preset classification algorithm is associated with the test word segmentation list; and
the classifying the target text according to the target preset word segmentation list comprises:
calibrating the preset classification algorithm according to the target preset word segmentation list, and classifying the target text according to the calibrated preset classification algorithm.

2. The method according to claim 1, wherein the calculating classification accuracy of the first text and classification accuracy of the second text comprises:
separately calculating, for each new word, classification accuracy of a first text corresponding to the each new word and classification accuracy of a second text corresponding to the each new word.

3. The method according to claim 2, wherein the comparing the classification accuracy of the first text with the classification accuracy of the second text, and determining a target new word from the new word according to a comparison result comprises:
subtracting the classification accuracy of the first text corresponding to the each new word from the classification accuracy of the second text corresponding to the new word, to obtain a difference;
determining whether the difference meets a preset difference; and
determining the new word as the target new word if the difference meets the preset difference.

4. The method according to claim 1, wherein the comparing the word segmentation result with a preset word segmentation list, to obtain a word segmentation result, which is not in the preset word segmentation list, as a new word comprises:
determining whether a word in the word segmentation result matches a word in the preset word segmentation list, and if not, collecting statistics on an eigenvalue of a word, which does not match the word in the preset word segmentation list, in the word segmentation result, wherein the eigenvalue comprises a frequency at which the mismatched word appears in the target text; and
determining the mismatched word as the new word if the eigenvalue of the mismatched word meets a preset eigenvalue.

5. The method according to claim 1, wherein the performing word segmentation on a target text according to a preset fixed word segmentation policy comprises:
intercepting the target text every N characters from the first character, to obtain multiple word strings, wherein a character quantity of each word string is N, and N is a positive integer greater than 1.

6. A text information processing apparatus, the apparatus comprising:
one or more processors;
a memory; and
one or more program modules, stored in the memory, executed by the one or more processors, and the one or more program modules comprising:
a new-word processing module, configured to perform word segmentation on a target text according to a preset fixed word segmentation policy, to obtain a word segmentation result; and compare the word segmentation result with a preset word segmentation list, to obtain a word segmentation result, which is not in the preset word segmentation list, as a new word;
an adding module, configured to add the new word to the preset word segmentation list, to obtain a test word segmentation list;
a test-text classification module, configured to classify a test text according to the preset word segmentation list, to obtain a first text, and classify the test text according to the test word segmentation list, to obtain a second text;
a target-new-word determining module, configured to calculate classification accuracy of the first text and classification accuracy of the second text, compare the classification accuracy of the first text with the classification accuracy of the second text, and determine a target new word from the new word according to a comparison result; and
a target-text classification module, configured to add the target new word to the preset word segmentation list, to obtain a target preset word segmentation list; and classify the target text according to the target preset word segmentation list,
wherein the test-text classification module comprises:
a first classification unit, configured to classify the test text according to a preset classification algorithm, to obtain the first text, wherein the preset classification algorithm is associated with the preset word segmentation list; and
a second classification unit, configured to classify the test text according to the preset classification algorithm, to obtain the second text, wherein the preset classification algorithm is associated with the test word segmentation list; and
the target-text classification module classifies the target text according to the target preset word segmentation list comprises:
calibrating the preset classification algorithm according to the target preset word segmentation list, and classifying the target text according to the calibrated preset classification algorithm.

7. The apparatus according to claim 6, wherein the target-new-word determining module comprises:
a calculation unit, configured to separately calculate, for each new word, classification accuracy of a first text corresponding to the each new word and classification accuracy of a second text corresponding to the each new word.

8. The apparatus according to claim 7, wherein the target-new-word determining module comprises:
a first judging unit, configured to subtract the classification accuracy of the first text corresponding to the each new word from the classification accuracy of the second text corresponding to the new word, to obtain a difference; and determine whether the difference meets a preset difference; and a first determining unit, configured to determine the new word as the target new word when a determining result of the first judging unit is yes.

9. The apparatus according to claim 6, wherein the new-word processing module comprises:

a second judging unit, configured to determine whether a word in the word segmentation result matches a word in the preset word segmentation list;

a statistics collecting unit, configured to collect statistics on an eigenvalue of a word, which does not match the word in the preset word segmentation list, in the word segmentation result when a determining result of the second judging unit is no, wherein the eigenvalue comprises a frequency at which the mismatched word appears in the target text; and a second determining unit, configured to determine the mismatched word as the new word if the eigenvalue of the mismatched word meets a preset eigenvalue.

10. The apparatus according to claim 6, wherein that the new-word processing module performs word segmentation on a target text according to a preset fixed word segmentation policy specifically comprises:

intercepting the target text every N characters from the first character, to obtain multiple word strings, wherein a character quantity of each word string is N, and N is a positive integer greater than 1.

11. A non-transitory computer readable storage medium, having computer executable instructions stored therein, and when these executable instructions run in a terminal, the terminal executing a text information processing method, comprising:

performing word segmentation on a target text according to a preset fixed word segmentation policy, to obtain a word segmentation result;

comparing the word segmentation result with a preset word segmentation list, to obtain a word segmentation result, which is not in the preset word segmentation list, as a new word;

adding the new word to the preset word segmentation list, to obtain a test word segmentation list;

classifying a test text according to the preset word segmentation list, to obtain a first text, and classifying the test text according to the test word segmentation list, to obtain a second text;

calculating classification accuracy of the first text and classification accuracy of the second text;

comparing the classification accuracy of the first text with the classification accuracy of the second text, and determining a target new word from the new word according to a comparison result;

adding the target new word to the preset word segmentation list, to obtain a target preset word segmentation list; and classifying the target text according to the target preset word segmentation list, wherein the classifying a test text according to the preset word segmentation list, to obtain a first text, and classifying the test text according to the test word segmentation list, to obtain a second text comprises:

classifying the test text according to a preset classification algorithm, to obtain the first text, wherein the preset classification algorithm is associated with the preset word segmentation list; and classifying the test text according to the preset classification algorithm, to obtain the second text, wherein the preset classification algorithm is associated with the test word segmentation list; and the classifying the target text according to the target preset word segmentation list comprises:

calibrating the preset classification algorithm according to the target preset word segmentation list, and classifying the target text according to the calibrated preset classification algorithm.

12. The storage medium according to claim 11, wherein the calculating classification accuracy of the first text and classification accuracy of the second text comprises:

separately calculating, for each new word, classification accuracy of a first text corresponding to the each new word and classification accuracy of a second text corresponding to the each new word.

13. The storage medium according to claim 12, wherein the comparing the classification accuracy of the first text with the classification accuracy of the second text, and determining a target new word from the new word according to a comparison result comprises:

subtracting the classification accuracy of the first text corresponding to the each new word from the classification accuracy of the second text corresponding to the new word, to obtain a difference;

determining whether the difference meets a preset difference; and determining the new word as the target new word if the difference meets the preset difference.

14. The storage medium according to claim 11, wherein the comparing the word segmentation result with a preset word segmentation list, to obtain a word segmentation result, which is not in the preset word segmentation list, as a new word comprises:

determining whether a word in the word segmentation result matches a word in the preset word segmentation list, and if not, collecting statistics on an eigenvalue of a word, which does not match the word in the preset word segmentation list, in the word segmentation result, wherein the eigenvalue comprises a frequency at which the mismatched word appears in the target text; and determining the mismatched word as the new word if the eigenvalue of the mismatched word meets a preset eigenvalue.

15. The storage medium according to claim 11, wherein the performing word segmentation on a target text according to a preset fixed word segmentation policy comprises:

intercepting the target text every N characters from the first character, to obtain multiple word strings, wherein a character quantity of each word string is N, and N is a positive integer greater than 1.

* * * * *